Sept. 24, 1957   K. J. DUDDLESTON   2,807,499
COMPRESS AIR SPREADER FOR A VEHICLE TARPAULIN COVER
Filed April 29, 1955   2 Sheets-Sheet 1
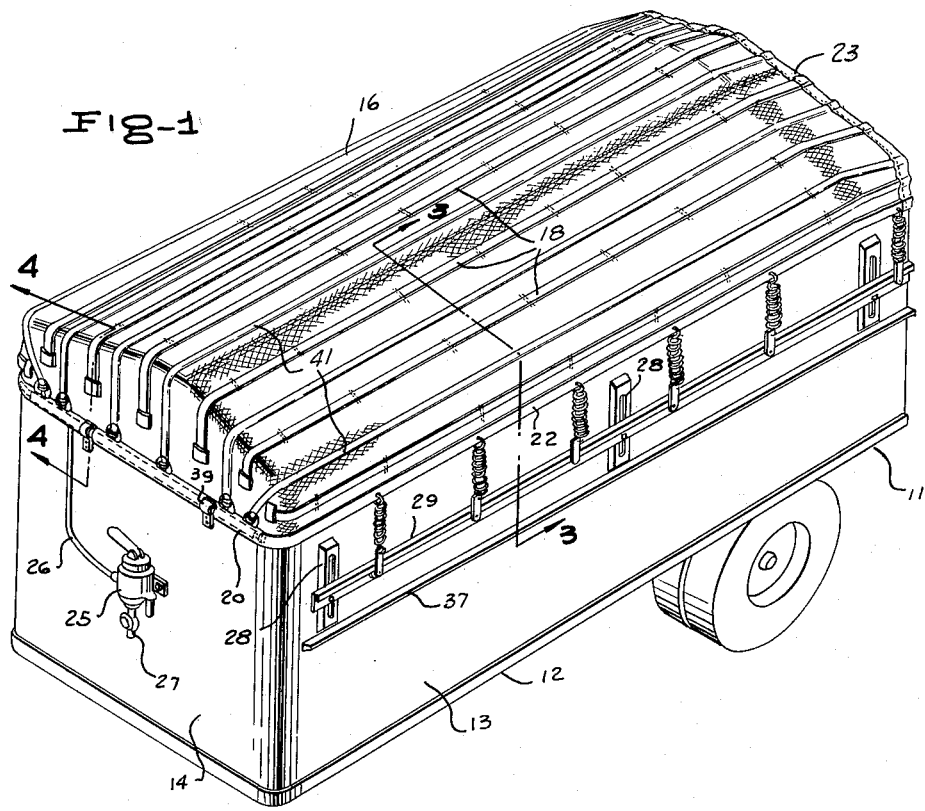
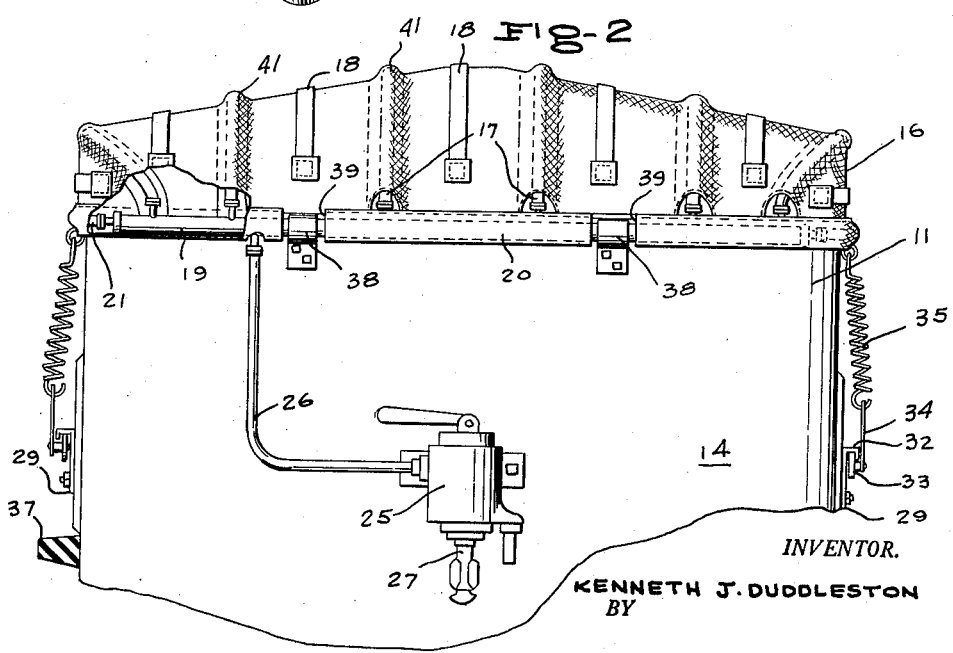
INVENTOR.
KENNETH J. DUDDLESTON
BY
McMorrow, Berman & Davidson
ATTORNEYS Sept. 24, 1957 K. J. DUDDLESTON 2,807,499
COMPRESS AIR SPREADER FOR A VEHICLE TARPAULIN COVER
Filed April 29, 1955 2 Sheets-Sheet 2
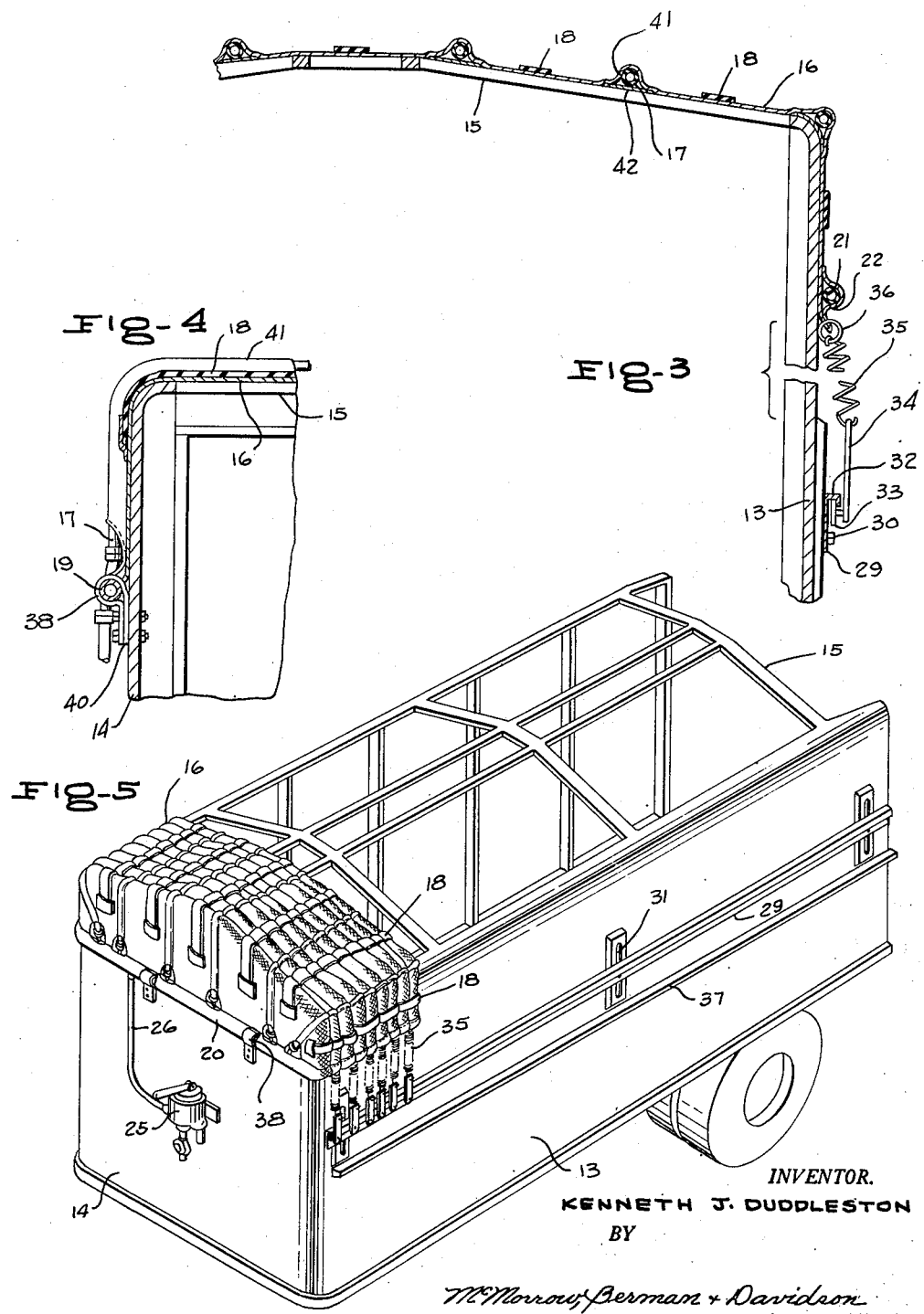
INVENTOR.
KENNETH J. DUDDLESTON
BY
McMorrow, Berman + Davidson
ATTORNEYS

United States Patent Office 2,807,499
Patented Sept. 24, 1957

2,807,499

COMPRESS AIR SPREADER FOR A VEHICLE TARPAULIN COVER

Kenneth J. Duddleston, Chicago, Ill.

Application April 29, 1955, Serial No. 504,833

3 Claims. (Cl. 296—100)

This invention relates to covering means for vehicle bodies, and more particularly to an improved pneumatically operated tarpaulin device for covering a truck or similar load-carrying vehicle.

A main object of this invention is to provide a novel and improved foldable cover device for a truck or similar load-carrying vehicle, said cover device being simple in construction, being easy to extend to a covering position thereof, and being provided with means for automatically collapsing same when the vehicle is to be uncovered.

A further object of the invention is to provide an improved flexible tarpaulin device for use on a load-carrying vehicle, such as a truck or the like, said device involving inexpensive components, being durable in construction, being smooth in action, and providing a means for rapidly covering or uncovering the vehicle on which it is mounted without the expenditure of manual labor and without requiring handling of bulky and cumbersome tarpaulins, as presently practiced.

Further objects and advantages of the invention will become apparent from the following description and claims, and from the accompanying drawings, wherein:

Figure 1 is a perspective view of a trailer truck provided with an improved foldable tarpaulin device according to the present invention, the tarpaulin device being shown in its extended position covering the top of the trailer truck.

Figure 2 is an enlarged front elevational view, partly in cross section, of the upper portion of the trailer truck of Figure 1.

Figure 3 is an enlarged cross sectional detail view taken on the line 3—3 of Figure 1.

Figure 4 is an enlarged cross sectional detail view taken on the line 4—4 of Figure 1.

Figure 5 is a perspective view similar to Figure 1 but showing the tarpaulin device in its collapsed position.

Referring to the drawings, 11 designates a conventional trailer truck having a floor 12 and side and front walls, shown at 13 and 14, rigidly fixed to each other and to the floor 12. Generally designated at 15 is a roof framework which is rigidly secured to the top edges of the side walls 13 and the front wall 14.

Designated generally at 16 is a flexible tarpaulin device which overlies the roof framework and which is slidable thereon. The tarpaulin device 16 comprises a sheet of flexible material, such as canvas or the like, as ordinarily employed in tarpaulins, said sheet being of sufficient length to extend to the full longitudinal length of the roof framework 15 and of sufficient width to extend transversely across said roof framework and to depend on the opposite sides of the trailer truck adjacent the side walls 13 thereof.

Secured to the tarpaulin 16 in any suitable manner, as by stitching, or the like, are a plurality of longitudinally extending, evenly spaced elastic strips 17, of rubber or the like, said strips being stretchable to the extended positions thereof shown in Figure 1, but being normally contractile to the positions thereof shown in Figure 5, biasing the tarpaulin 16 to a collapsed position, such as that shown in Figure 5.

Also secured longitudinally on the tarpaulin 16 in any suitable manner, as by stitching, molding, or the like, are a plurality of longitudinally extending flexible conduits 18, of rubber or the like, said conduits being spaced between the flexible strips 17, as shown in Figure 1, and being extensible in the same manner as the strip 17 and being collapsible to the position shown in Figure 5. The conduits 18 are connected at their forward ends to a transversely extending rigid conduit 19 which is disposed in a tubular hem 20 provided at the front transverse end of the tarpaulin 16. The ends of the rigid conduit 19 are suitably connected to longitudinally extending flexible conduits 21 disposed in the longitudinally extending side portions 22 of the tubular hem 20.

At the rear end of the tarpaulin 16, the strips 17 and conduits 18 are received beneath a transversely extending hem 23 provided on the rear edge of the tarpaulin.

Designated at 25 is a control valve which is mounted on the front wall 14 of the trailer truck and which is connected by a conduit 26 to the rigid conduit 19. The control valve 25 has an air inlet conduit 27 adapted to be connected to any suitable source of compressed air, or the like, for inflating the flexible conduits 18 and 21 of the tarpaulin.

Secured to the side walls 13 of the trailer truck are a plurality of spaced vertical bracket members 28, and adjustably secured to said bracket members 28 are longitudinally extending guide rails 29, said guide rails being fastened to the brackets 28 by suitable bolts 30 engaged in vertical slots 31 provided in the brackets 28 and provided with suitable nut means so that the rails 29 may be secured in vertically adjusted positions to said brackets. The rails 29 are provided with channeled, downwardly facing top flanges 32 in which are engaged respective rollers 33 carried by depending fastening bars 34, each fastening bar 34 being connected by a coiled spring 35 to a ring 36 secured to the side hem portion 22 of the tarpaulin located thereabove, as is clearly shown in Figure 3. Thus, the connection bars 34, springs 35 and rollers 33 yieldably and slidably connect the side edges of the tarpaulin 16 to the respective guide rails 32, guiding the side edges of the tarpaulin when the tarpaulin is extended from the position thereof shown in Figure 5 to the position thereof shown in Figure 1, or when the tarpaulin is contracted from the position of Figure 1 to the position of Figure 5.

Suitable longitudinal bumpers 37 of rubber, or similar shock absorbing material, are secured to the side walls 13 of the trailer truck subjacent to the brackets 28, the bumpers being of sufficient lateral extent to project beyond the rails 32, serving to protect said rails and the elements connected thereto against damage from collision or other contact with external objects.

In operation, a suitable source of compressed air is connected to the control valve 25, with the tarpaulin in the position thereof shown in Figure 5, after which the control valve 25 is opened, causing the compressed air to enter the respective flexible conduits 18 and 21 of the tarpaulin. This expands the tarpaulin to the extended position thereof shown in Figure 1, after which the control valve 25 may be closed and may be disconnected from the compressed air source. As above explained, the side edges of the tarpaulin are guided during the extension of the tarpaulin by the cooperation of the rollers 33 with the channeled guide rails 29.

When it is desired to collapse the tarpaulin, it is merely necessary to open the control valve 25, allowing the air to escape from the flexible conduits 18 and 21, and allowing the contractile rubber strips 17 to contract the tarpaulin to the collapsed position thereof shown in Figure 5, the side edges of the tarpaulin being guided along the sides of the truck body by the cooperation of the rollers 33 with the guide rails 29.

As is clearly shown in Figure 4, the rigid conduit 19 is secured to the front wall 14 of the trailer truck by a plurality of looped fastening straps 38, said straps being located in notched portions 39 provided therefor in the front hem 20 of the tarpaulin. As shown in Figure 4, the fastening straps 38 surround the rigid conduit 19 and are provided with apertured, overlapping end lugs 40 through which suitable bolts extend to secure the fastening straps to the front wall 14 of the trailer truck.

As above stated, the longitudinal flexible conduit 17 may be secured in the tarpaulin 16 in any suitable manner. For example, as shown in Figures 2 and 3, the main body of the flexible tarpaulin 16 is formed with channel-like longitudinal loops 41 to the opposite side portions of which are stitched the opposite side edges of respective longitudinally extending canvas strips 42 defining longitudinally extending tubes in which the inflatable flexible conduits 17 are received.

While a specific embodiment of an improved automatic tarpaulin device for a load-carrying vehicle or the like has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle body having a floor, side and front walls rigidly fixed with respect to each other and to said floor, a roof framework rigidly secured to the top edges of said side and front walls, a flexible tarpaulin overlying said roof framework and being slidable thereon, means securing the front edge of the tarpaulin to the front wall, means slidably connecting the side edges of the tarpaulin to said side walls, a plurality of collapsible longitudinally extending flexible conduits positioned in lateral spaced relation and secured on said tarpaulin and extending substantially the entire length thereof, a transverse conduit secured on the end of said tarpaulin adjacent said front wall and communicating with said longitudinal conduits, and an air valve connected to said transverse conduit and being arranged for connection to a source of compressed air.

2. In a vehicle body having a floor, side and front walls rigidly fixed with respect to each other and to said floor, a roof framework rigidly secured to the side edges of said side and front walls, a flexible tarpaulin overlying said roof framework and being slidable thereon, means securing the front edge of the tarpaulin to the front wall, means slidably connecting the side edges of the tarpaulin to said side walls, a plurality of elastic strips secured longitudinally in said tarpaulin and biasing said tarpaulin to a contracted condition, a plurality of collapsible longitudinally extending flexible conduits secured on said tarpaulin and extending substantially the entire length thereof, a transverse conduit secured on the end of said tarpaulin adjacent said front wall and communicating with said longitudinal conduits, and an air valve connected to said transverse conduit and being arranged for connection to a source of compressed air.

3. In a vehicle body having a floor, side and front walls rigidly fixed with respect to each other and to said floor, a roof framework rigidly secured to the top edges of said side and front walls, a flexible tarpaulin overlying said roof framework and being slidable thereon, means securing the front edge of the tarpaulin to the front wall, longitudinal guide rails mounted on said side walls, yieldable means connected to the side edges of the tarpaulin and slidably engaging said guide rails, a plurality of elastic strips secured longitudinally on said tarpaulin for substantially the entire longitudinal length thereof and biasing the tarpaulin to a contracted condition, a plurality of collapsible longitudinally extending flexible conduits secured on said tarpaulin and extending substantially the entire length thereof, a rigid transverse conduit secured on the end of said tarpaulin adjacent said front wall and communicating with said longitudinal conduits, means securing said rigid transverse conduit to said front wall, and an air valve connected to said transverse conduit and being arranged for connection to a source of compressed air.

References Cited in the file of this patent

UNITED STATES PATENTS

| | | |
|---|---|---|
| 2,443,478 | Reid | June 15, 1948 |
| 2,448,054 | Seckel | Aug. 31, 1948 |
| 2,496,437 | Bramble | Feb. 7, 1950 |
| 2,623,779 | Catell | Dec. 30, 1952 |
| 2,733,054 | Blake | Feb. 7, 1956 |
| 2,747,929 | Masano | May 29, 1956 |